US012559142B2

(12) United States Patent
Hermann

(10) Patent No.: US 12,559,142 B2
(45) Date of Patent: Feb. 24, 2026

(54) METHOD FOR OPERATING A SELF-DRIVING VEHICLE BY COMMUNICATING ABOUT A BLOCKED PATH

(71) Applicant: MERCEDES-BENZ GROUP AG, Stuttgart (DE)

(72) Inventor: Klaus Alfred Hermann, Gärtringen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 325 days.

(21) Appl. No.: 18/021,628

(22) PCT Filed: Jun. 28, 2021

(86) PCT No.: PCT/EP2021/067657
§ 371 (c)(1),
(2) Date: Feb. 16, 2023

(87) PCT Pub. No.: WO2022/037829
PCT Pub. Date: Feb. 24, 2022

(65) Prior Publication Data
US 2024/0034361 A1 Feb. 1, 2024

(30) Foreign Application Priority Data
Aug. 17, 2020 (DE) ..................... 10 2020 005 013.1

(51) Int. Cl.
*G08G 1/0965* (2006.01)
*B60W 60/00* (2020.01)
(Continued)

(52) U.S. Cl.
CPC ....... *B60W 60/0027* (2020.02); *G08G 1/0125* (2013.01); *G08G 1/096791* (2013.01);
(Continued)

(58) Field of Classification Search
CPC ......... B60W 60/0027; B60W 2552/50; B60W 2554/40; B60W 2556/65;
(Continued)

(56) References Cited

U.S. PATENT DOCUMENTS 9,442,489 B2 * 9/2016 Reichel .................. G08G 1/164
10,787,172 B2 9/2020 Aoki et al.
(Continued)

FOREIGN PATENT DOCUMENTS

CN 109416542 A 3/2019
CN 109878515 A 6/2019
(Continued)

OTHER PUBLICATIONS

Douglas McBee, "Responsibilities of emergency vehicle drivers", 2005, West Metro Fire Protection District (Year: 2005).*
(Continued)

*Primary Examiner* — Jelani A Smith
*Assistant Examiner* — George A Alcorn, III
(74) *Attorney, Agent, or Firm* — PATENT PORTFOLIO BUILDERS PLLC

(57) ABSTRACT

A method for operating a self-driving vehicle in the region of a crossing involves recording a further vehicle with right of way at the crossing and determining its intended path. If it is determined, based on the intended route, that the further vehicle will have to drive past the vehicle on one side after passing the crossing, it is determined whether the path of the further vehicle is blocked by an obstacle. If it is determined that the path of the further vehicle is blocked by an obstacle, a communication connection to the further vehicle is produced, via which the vehicle informs the further vehicle of the blocked path.

16 Claims, 2 Drawing Sheets

Figure 1:
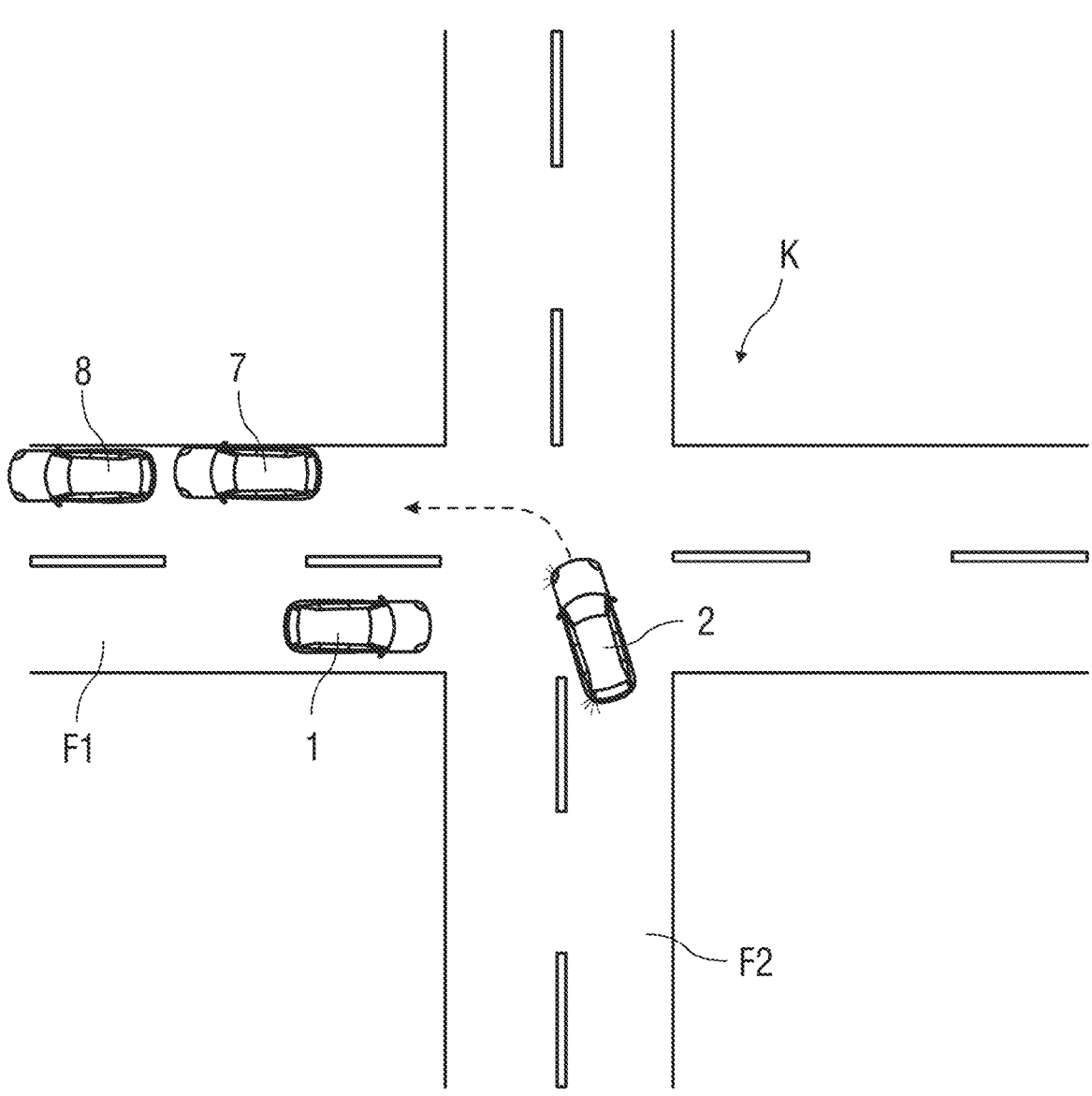

(51) Int. Cl.
*G08G 1/01* (2006.01)
*G08G 1/0967* (2006.01)

(52) U.S. Cl.
CPC ..... *B60W 2552/50* (2020.02); *B60W 2554/40* (2020.02); *B60W 2556/65* (2020.02)

(58) Field of Classification Search
CPC ..... B60W 30/18154; B60W 60/00276; B60W 60/0011; B60W 2756/10; G08G 1/0125; G08G 1/096791; G08G 1/0965; G08G 1/096741
USPC ........................................................ 701/26
See application file for complete search history.

(56) References Cited

U.S. PATENT DOCUMENTS

| | | | |
|---|---|---|---|
| 10,953,878 B2 | 3/2021 | Zinner et al. | |
| 11,117,513 B2 | 9/2021 | Wang | |
| 11,161,511 B2 | 11/2021 | Max et al. | |
| 11,285,970 B2 | 3/2022 | Pan et al. | |
| 11,312,394 B2 | 4/2022 | Matsunaga et al. | |
| 11,370,453 B2 | 6/2022 | Hiramatsu et al. | |
| 11,513,519 B1 * | 11/2022 | Akella ................. | G05D 1/0276 |
| 2015/0124096 A1 * | 5/2015 | Koravadi ............. | G06V 20/584 |
| | | | 348/148 |
| 2017/0249836 A1 | 8/2017 | Laur et al. | |
| 2018/0308360 A1 * | 10/2018 | Regmi ................. | B60W 30/09 |
| 2019/0043353 A1 * | 2/2019 | Kim ..................... | G05D 1/0088 |
| 2019/0236955 A1 | 8/2019 | Hu | |
| 2020/0086789 A1 * | 3/2020 | Nowakowski ........... | B60R 1/24 |
| 2020/0211378 A1 | 7/2020 | Umehara | |

FOREIGN PATENT DOCUMENTS

| | | | | | |
|---|---|---|---|---|---|
| CN | 109949596 A | 6/2019 | | | |
| CN | 110533900 A | 12/2019 | | | |
| CN | 110662683 A | 1/2020 | | | |
| DE | 102012215093 A1 | 2/2014 | | | |
| DE | 102012021282 A1 | 4/2014 | | | |
| DE | 102016004028 A1 | 2/2017 | | | |
| DE | 102016203086 A1 | 8/2017 | | | |
| DE | 102018004113 A1 | 10/2018 | | | |
| DE | 102018119832 A1 * | 2/2020 | ........ | B60W 50/0097 |
| DE | 102018119834 A1 | 2/2020 | | | |
| KR | 20200058613 A | 5/2020 | | | |
| WO | 2019073553 A1 | 4/2019 | | | |
| WO | 2020136385 A1 | 7/2020 | | | |

OTHER PUBLICATIONS

Notice of Reasons for Refusal dated Feb. 6, 2024 in related/corresponding JP Application No. 2023-505800.
Office Action dated Nov. 18, 2024 in related/corresponding KR Application No. 2023-7002420.
Office Action dated Sep. 23, 2024 in related/corresponding CN Application No. 202180055789.
International Search Report and Written Opinion mailed Oct. 8, 2021 in related/corresponding International Application No. PCT/EP2021/067657.
Office Action created Mar. 16, 2021 in related/corresponding DE Application No. 10 2020 005 013.1.

* cited by examiner

METHOD FOR OPERATING A SELF-DRIVING VEHICLE BY COMMUNICATING ABOUT A BLOCKED PATH

BACKGROUND AND SUMMARY OF THE INVENTION

Exemplary embodiments of the invention relate to a method for operating a self-driving vehicle in the region of a crossing.

DE 10 2016 203 086 A1 discloses a method and a driver assistance system for assisting a driver. An ego vehicle carries out a driving maneuver automatically, wherein objects in the environment of the ego vehicle are recognized while the driving maneuver is carried out. The objects are classified, whereby stationary objects forming bottlenecks and approaching vehicles are classified. The movement of the ego vehicle and the movement of approaching vehicles are then calculated in advance. Free surfaces in the vicinity of the stationary objects forming the bottlenecks are determined and first blockade situations are determined in which it is no longer possible for the ego vehicle to keep driving at a bottleneck due to an approaching vehicle and/or second blockade situations are determined in which no end of the bottleneck can be recognized via the ego vehicle, wherein a stopping position is determined when a blockade situation is determined, at which the ego vehicle stops until the blockade situation is resolved.

Exemplary embodiments of the invention are directed to a method for operating a self-driving vehicle.

A method for operating a self-driving vehicle, particularly a driverless vehicle in the region of a crossing provides that a further vehicle with right of way at the crossing is recorded and its intended path is determined according to the invention. In the event that it is determined with reference to the intended path that the further vehicle will have to drive past the vehicle on one side after passing the crossing, it is determined whether the path of the further vehicle is blocked by an obstacle. In the event that it is determined that the path of the further vehicle is blocked by an obstacle, a communication connection to the further vehicle is produced, via which the vehicle informs the further vehicle of the blocked path.

By using the method, a blockade situation involving the two vehicles can be largely avoided, particularly in the event that the two self-driving vehicles are at a right-before-left crossing, and the further vehicle with right of way intends to turn onto a road of the vehicle, and the further vehicle has to remain stationary in front of the vehicle as the further vehicle cannot drive by the vehicle on one side, e.g., due to a parked vehicle, such that the two vehicles remain there for an indeterminate amount of time without further action until the blockade situation can be resolved, e.g., with the assistance of a teleoperator.

A traffic flow can additionally be optimized, as it is possible to counteract the creation of a blockade situation of this kind, due to the fact that at least the vehicle recognizes the impending blockade situation, and the further vehicle communicates correspondingly so that a solution can be found.

Carrying out the method ensures that it is agreed in which order the two vehicles will pass the crossing. The order is particularly agreed upon in order to avoid the blockade situation, such that the vehicle resumes its driving mode first in order to pass the crossing, although the further vehicle has right of way.

In a development, it is additionally determined by means of the vehicle whether the further vehicle's view of the object blocking its path is obscured. The communication connection between the two vehicles is particularly immediately formed if it is determined that the further vehicle's view of the obstacle is obscured, in order to avoid the further vehicle resuming its driving mode, and thus the blockade situation arising for the two vehicles.

A further embodiment of the method provides that a remaining road width between the vehicle and the obstacle blocking the path of the further vehicle and a width of the further vehicle are determined in order to determine whether a blockade situation has arisen. The remaining road width and the width of the further vehicle are determined with reference to recorded signals of the vehicle here in order to carry out a comparison.

In one possible embodiment, the remaining road width is compared with the width of the further vehicle in order to determine whether a blockade situation will arise, such that it can be determined whether the remaining road width is sufficient for the further vehicle to drive past the vehicle on one side, and particularly to drive between the vehicle and the obstacle if the further vehicle passes the crossing first.

In one embodiment of the method, the intended path of the further vehicle is determined here with reference to an activated direction indicator and/or with reference to information provided via vehicle-to-vehicle communication. The vehicle thus has access to information about which path the further vehicle intends to take, such that it can be determined whether the obstacle on the road of the vehicle is relevant to a turning off process of the further vehicle.

The width of the further vehicle and a signal of the direction indicator set are sent to the vehicle via vehicle-to-vehicle communication by means of the further vehicle in order to test the plausibility of the width of the further vehicle. The plausibility of the path of the further vehicle and the remaining road width between the vehicle and the obstacle can thus be tested.

The further vehicle is also self-driven and without a driver, so that no misunderstanding by vehicle users of the two vehicles is possible, in order to avoid or resolve the blockade situation as far as possible.

BRIEF DESCRIPTION OF THE DRAWING FIGURES

Exemplary embodiments of the invention are explained in more detail in the following with reference to drawings.

Figure 2:
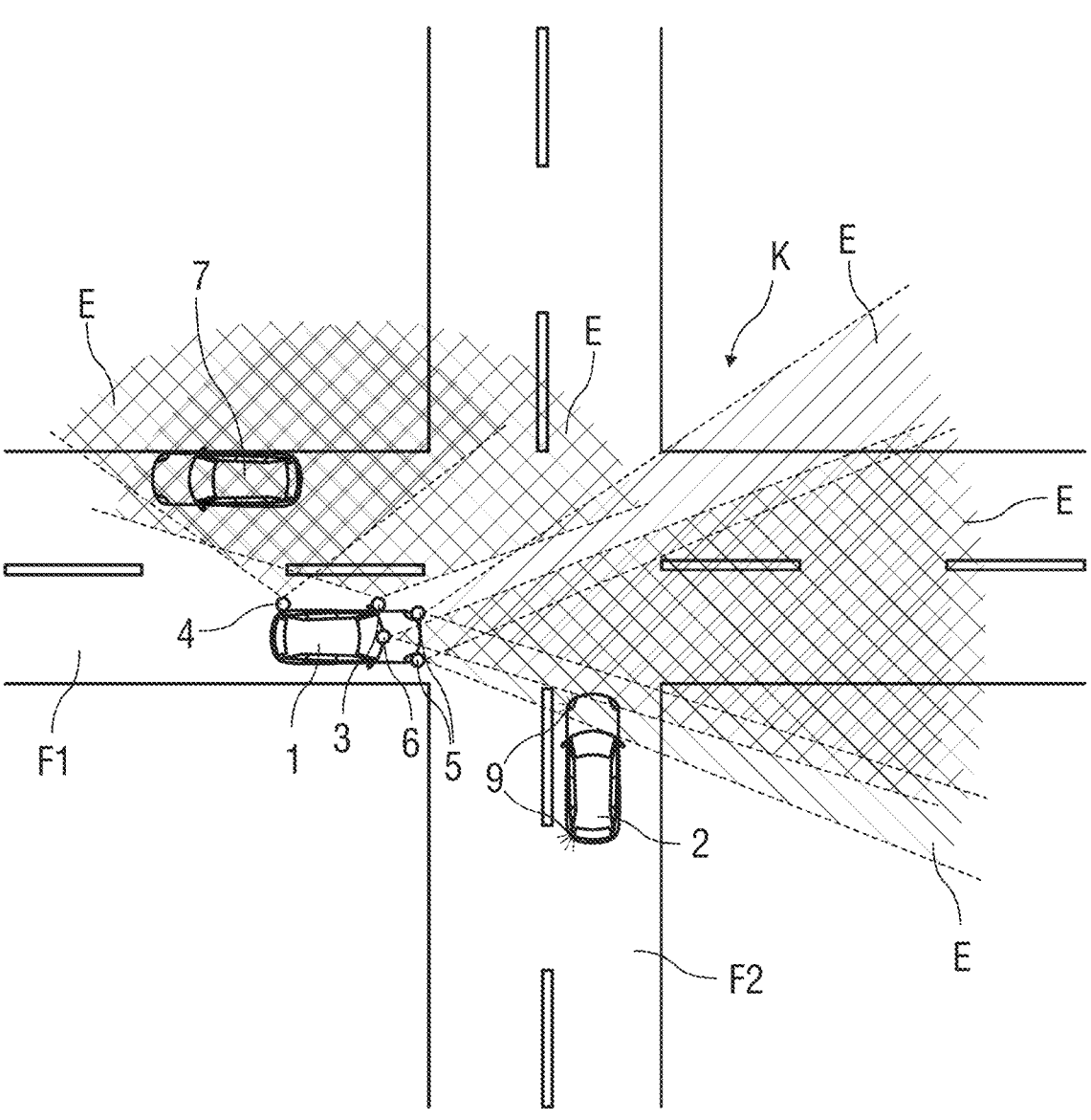

In the following:

FIG. 1 Schematically shows a crossing region without road signs regulating right of way, traffic lights or members of the police force, a vehicle and a further vehicle turning off to the left; and FIG. 2 schematically shows the crossing region having the two vehicles and a respective region recorded by recording units of an environment sensor of the vehicle.

Parts corresponding to one another are provided with the same reference numerals in every figure.

DETAILED DESCRIPTION

FIG. 1 shows a region of a crossing K without traffic signs regulating right of way, traffic lights, or members of the police force. A vehicle 1 is waiting on a road F1 of the crossing K observing right of way regulations, wherein a further vehicle 2 turning left is stationary on a further road F2 of the crossing. The further vehicle 2 has right of way over the vehicle 1.

The crossing K is depicted in FIG. 2 with the two vehicles 1, 2 and a respective region E recorded by recording units 3 to 6 of an environment sensor of the vehicle 1.

The two vehicles 1, 2 are driving in the self-driving mode, wherein a driving task is carried out entirely by the respective vehicle 1, 2 and no vehicle user is in the respective vehicle 1, 2.

Two vehicles 7, 8 parked longitudinally are stationary in an opposite lane of the road F1 of the vehicle 1, wherein a first parked vehicle 7 is partially next to the vehicle 1.

If the further vehicle 2 coming from the vehicle's 1 right turns off onto the road F1 of the vehicle 1 before the vehicle 1, the further vehicle 2 cannot pass the vehicle 1 on one side, and remains stationary in front of the vehicle 1. A blockade situation is thus present for the two vehicles 1, 2, such that the two vehicles 1, 2 remain in this blockade situation for an indeterminate amount of time without further action until, for example, a teleoperator takes over a remote steering of at least one of the two vehicles 1, 2 in order to resolve the blockade situation or the first parked vehicle 7 leaves its parked position.

A method described in the following is provided in order to prevent a blockade situation of this kind as far as possible.

The vehicle 1 comprises the environment sensor having at least the recording units 3 to 6, which continuously record signals in the driving mode of the vehicle 1. An environment of the vehicle 1 and objects located in the latter, and thus also the further vehicle 2, are detected using the recorded signals.

At least the first parked vehicle 7 next to the vehicle 1 is detected using recorded signals of a recording unit 3 particularly formed as a side camera and using recorded signals of a recording unit 4 formed as a radar-based rear side sensor. The first parked vehicle 7 is particularly recognized as an object and obstacle that prevents a further vehicle 2 potentially approaching the vehicle 1 in the opposite lane of its road F1 from passing through. This means that a road width for the further vehicle 2 to pass through, i.e., a spacing between the vehicle 1 and the first parked vehicle 7 is too small.

Consequently, the remaining road width between the vehicle 1 and the first parked vehicle 7 is identified as an obstacle using recorded signals, particularly of the recording unit 4 formed as a side camera. An obstacle causing a blockade situation can also be a construction site fence or another object blocking a path of the further vehicle 2 in the opposite lane of the vehicle 1.

The further vehicle 2 and its activated direction indicator 9 are detected using recorded signals of a recording unit 5 formed as a radar-based front corner sensor and using recorded signals of a recording unit 6 formed as a front camera. A width of the further vehicle 2 is additionally particularly detected using signals of the recording units 5, 6.

As the direction indicator 9 of the further vehicle 2 is activated, a path of the further vehicle 2 can be determined, wherein the further vehicle 2 intends to turn left.

In order to determine whether the further vehicle 2 can still pass the vehicle 1 on one side despite the first parked vehicle 7, the determined remaining road width between the vehicle 1 and the first parked vehicle 7 is compared with the determined width of the further vehicle 2.

The further vehicle 2 sends its width and a signal of the direction indicator 9 set to the vehicle 1 via a communication connection in order to test the plausibility of the width of the further vehicle 2.

In an embodiment of the method, it is provided that it is determined by means of the recorded signals of the environment sensor of the vehicle 1 whether the further vehicle's 2 view of the obstacle blocking its path in the form of the first parked vehicle 1 is obscured.

The further vehicle 2 has priority to pass the crossing K over the vehicle 1, as the crossing K is an equal-ranking crossing K.

The communication connection between the two vehicles 1, 2 is formed again if it is determined by the vehicle 1 that a blockade situation will arise between the vehicle 1 and the further vehicle 2 if the further vehicle 1 makes use of its right of way and, in addition, the further vehicle's 2 view of the first parked vehicle 7 is obscured.

The further vehicle 2 is informed of its blocked path and the further vehicle 2 confirms receipt of this information via the communication connection, particularly a vehicle-to-vehicle communication. Despite the existing right of way of the further vehicle 2, it is then agreed between the two vehicles 1, 2 which of the two vehicles 1, 2 should pass the crossing K first.

In the event that the further vehicle 1 passes the crossing K first, the vehicles 1, 2 will accordingly agree that the further vehicle 2 will notify the vehicle 1 via the existing communication connection that the vehicle 1 will pass the crossing K before the further vehicle 2 due to the arising blockade situation.

The further vehicle 2 particularly sends right of way awareness information to the vehicle 1, which confirms the receipt of said information in turn and resumes its self-driving mode.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a self-driving vehicle in a region of a crossing, the method comprising:

recording, by an environment sensor of the self-driving vehicle while the self-driving vehicle is parked at the crossing according to right of way regulations, a further self-driving vehicle with right of way at the crossing;

determining, by the self-driving vehicle, an intended path of the further self-driving vehicle;

determining, by the self-driving vehicle based on the determined intended path of the further self-driving vehicle, that the further self-driving vehicle will have to drive past the self-driving vehicle on one side after passing the crossing;

determining, by the self-driving vehicle when it is determined that the further self-driving vehicle will have to drive past the self-driving vehicle, whether the intended path of the further self-driving vehicle is blocked by an obstacle;

establishing, by the self-driving vehicle with the further self-driving vehicle, a communication connection when it is determined that the intended path of the further self-driving vehicle is blocked by an obstacle;

informing, by the self-driving vehicle using the established communication connection, the further self-driving vehicle of the blocked path; and proceeding, by the self-driving vehicle, through the crossing before the further self-driving vehicle, which has the right of way at the crossing, proceeds through the crossing.

2. The method of claim 1, further comprising:

establishing an agreement between the self-driving vehicle and the further self-driving vehicle of an order that the self-driving vehicle and the further self-driving vehicle will pass the crossing.

3. The method of claim 1, further comprising:

determining, by the self-driving vehicle, whether the further self-driving vehicle's view of the obstacle blocking its path is obscured.

4. The method of claim 1, further comprising:

determining whether a blockade situation will occur at the crossing by determining a remaining road width between the self-driving vehicle and the obstacle blocking the path of the further self-driving vehicle and a width of the further self-driving vehicle.

5. The method of claim 4, wherein the remaining road width is compared with the width of the further self-driving vehicle to determine whether the blockade situation will occur.

6. The method of claim 4, wherein the intended path of the further self-driving vehicle is determined with reference to an activated direction indicator or with reference to information provided by the further self-driving vehicle via vehicle-to-vehicle communication.

7. The method of claim 6, wherein the width of the further self-driving vehicle and a signal of the activated direction indicator set are sent to the self-driving vehicle via vehicle-to-vehicle communication by the further self-driving vehicle to test a plausibility of the width of the further self-driving vehicle.

8. The method of claim 1, wherein the further self-driving vehicle is operated without a driver.

9. The method of claim 1, wherein the further self-driving vehicle following the intended path blocked by the obstacle prevents the self-driving vehicle from passing through the crossing.

10. A method for operating a self-driving vehicle in a region of a crossing, the method comprising:

recording, by an environment sensor of the self-driving vehicle, a further self-driving vehicle parked at the crossing;

determining, by the self-driving vehicle, that the further self-driving vehicle has right of way at the crossing;

parking, by the self-driving vehicle, at the crossing according to right of way regulations;

determining, by the self-driving vehicle, an intended path of the further self-driving vehicle;

determining, by the self-driving vehicle based on the determined intended path of the further self-driving vehicle, that the further self-driving vehicle is turning at the crossing and will have to drive past the self-driving vehicle on one side after passing the crossing;

determining, by the self-driving vehicle when it is determined that the further self-driving vehicle will have to drive past the self-driving vehicle, whether the intended path of the further self-driving vehicle is blocked by an obstacle on the one side of the self-driving vehicle;

determining, by the self-driving vehicle, that the further self-driving vehicle following the intended path that is blocked by the obstacle will prevent the self-driving vehicle from passing through the crossing;

establishing, by the self-driving vehicle with the further self-driving vehicle, a communication connection when it is determined that the intended path of the further self-driving vehicle is blocked by an obstacle;

informing, by the self-driving vehicle using the established communication connection, the further self-driving vehicle of the blocked path; and proceeding, by the self-driving vehicle, through the crossing before the further self-driving vehicle proceeds through the crossing.

11. The method of claim 10, further comprising:

establishing an agreement between the self-driving vehicle and the further self-driving vehicle of an order that the self-driving vehicle and the further self-driving vehicle will pass the crossing.

12. The method of claim 10, further comprising:

determining, by the self-driving vehicle, whether the further self-driving vehicle's view of the obstacle blocking its path is obscured.

13. The method of claim 10, further comprising:

determining whether a blockade situation will occur at the crossing by determining a remaining road width between the self-driving vehicle and the obstacle blocking the path of the further self-driving vehicle and a width of the further self-driving vehicle.

14. The method of claim 13, wherein the remaining road width is compared with the width of the further self-driving vehicle to determine whether the blockade situation will occur.

15. The method of claim 13, wherein the intended path of the further self-driving vehicle is determined with reference to an activated direction indicator or with reference to information provided by the further self-driving vehicle via vehicle-to-vehicle communication.

16. The method of claim 15, wherein the width of the further self-driving vehicle and a signal of the activated direction indicator set are sent to the self-driving vehicle via vehicle-to-vehicle communication by the further self-driving vehicle to test a plausibility of the width of the further self-driving vehicle.

* * * * *